(12) United States Patent
Lee

(10) Patent No.: US 6,191,758 B1
(45) Date of Patent: Feb. 20, 2001

(54) COMPUTER HAVING AUXILIARY DISPLAY DEVICE

(75) Inventor: Sang-jin Lee, Kyungki-do (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/106,742

(22) Filed: Jun. 30, 1998

(30) Foreign Application Priority Data

Jun. 30, 1997 (KR) .................................................. 97-29329

(51) Int. Cl.⁷ .................................................. G09G 5/00
(52) U.S. Cl. .................................................. 345/2; 345/211
(58) Field of Search .................................. 345/1, 2, 3, 112, 345/502, 520, 508, 512, 211, 212, 213

(56) References Cited

U.S. PATENT DOCUMENTS

| | | | |
|---|---|---|---|
| 5,138,305 | 8/1992 | Tomiyasu | 345/3 |
| 5,150,109 | 9/1992 | Berry | 345/3 |
| 5,293,485 | 3/1994 | Zenda | 345/3 |
| 5,307,055 | 4/1994 | Baskin et al. | 345/1 |
| 5,384,576 * | 1/1995 | Tashiro et al. | 345/3 |
| 5,428,739 * | 6/1995 | Maeda | 345/3 |
| 5,579,025 * | 11/1996 | Itoh | 345/3 |
| 5,633,923 * | 5/1997 | Kovarik | 345/3 |
| 5,694,141 | 12/1997 | Chee | 345/1 |
| 5,710,570 * | 1/1998 | Wada | 345/3 |

* cited by examiner

Primary Examiner—Xiao Wu
(74) Attorney, Agent, or Firm—Robert E. Bushnell, Esq.

(57) ABSTRACT

A computer having an auxiliary display device which enables a user to work more effectively by including an auxiliary display device as well as a main display device, is provided. The computer having an auxiliary display device includes an input device for inputting user's commands, a computer body for performing a predetermined program according to the commands input to the input device, a main display device for displaying signals output from the computer body on a screen, and an auxiliary display device for displaying the signals output from the computer body on a screen together with the main display device. The computer body also includes a main display controller for controlling the main display device and an auxiliary display controller for controlling the auxiliary display device, and after booting when a power supply of the computer body is turned on, the computer body executes a predetermined application program, and displays the execution result thereof on the auxiliary display device through the auxiliary display controller.

16 Claims, 7 Drawing Sheets

COMPUTER HAVING AUXILIARY DISPLAY DEVICE

CLAIM OF PRIORITY

This application makes reference to, incorporates the same herein, and claims all benefits accruing under 35 U.S.C §119 from an application entitled *Computer Having Auxiliary Display Device* earlier filed in the Korean Industrial Property Office on Jun. 30, 1997, and there duly assigned Ser. No. 97-29329 by that Office.

BACKGROUND OF THE INVENTION

1. Field of the Invention

The present invention relates to a computer, and more particularly, to a computer having an auxiliary display device which enables a user to work more effectively by including an auxiliary display device as well as a main display device.

2. Description of the Related Art

A conventional computer includes a computer body, input devices such as a key board, and one display device. Since the conventional computer has one display device, multi-tasking operation requires a screen division of the display device or several windows. Also, since a screen size of the display device is limited, according to circumstances, a user often feels uncomfortable to work even when the number of displayed windows is one.

For example, in the case that a calculator application program is used during performing a program such as a word processor or a spread sheet, a window should be moved or set by an active or inactive state in every operation.

Accordingly there is a need to provide a computer having an auxiliary display device which enables a user to work more effectively by including an auxiliary display device as well as a main display device. Conventional computer systems having more than one display device are depicted by U.S. Pat. No. 5,138,305 to Yuichi Tomiyasu entitled *Display Controller*; U.S. Pat. No. 5,150,109 to Wayne F. Berry entitled VGA *Controller Card*; U.S. Pat. No. 5,293,485 to Zenda entitled *Display Control Apparatus For Converting Color/Monochromatic CRT Gradation Into Flat Panel Display Gradation*; U.S. Pat. No. 5,307,055 to Herbert B. Baskin entitled *Display Control Device Incorporating An Auxiliary Display*; and U.S. Pat. No. 5,694,141 to Lawrence Chee entitled *Computer System With Double Simultaneous Displays Showing Differing Display Images*. Of the foregoing, it appears that only the U.S. Pat. No. 5,694,141 patent is capable of displaying different images simultaneously on separate display devices.

SUMMARY OF THE INVENTION

It is an object of the present invention to provide a computer having an auxiliary display device which enables a user to work more effectively by including an auxiliary display device as well as a main display device.

It is another object of the present invention to provide a display method of the execution result of an application program for a computer having an auxiliary display device which enables a user to work more effectively by including an auxiliary display device as well as a main display device.

To accomplish the first object of the present invention, there is provided a computer having an auxiliary display device including an input device for inputting user's commands, a computer body for performing a predetermined program according to the commands input to the input device, a main display device for displaying signals output from the computer body on a screen, and an auxiliary display device for displaying the signals output from the computer body on a screen together with the main display device, wherein the computer body includes a main display controller for controlling the main display device and an auxiliary display controller for controlling the auxiliary display device, and after booting when a power supply of the computer body is turned on, the computer body executes a predetermined application program, and displays the execution result thereof on the auxiliary display device through the auxiliary display controller.

Preferably, after a predetermined application program is executed, the computer body performs the steps of: a) checking display selection information of the application program or a user, to determine whether the main display device is selected or the auxiliary display device is selected; b) when it is determined that the main display device is selected in the step a), displaying the execution result of the application program on the main display device through the main display controller; and c) when it is determined that the auxiliary display device is selected in the step a), displaying the execution result of the application program on the auxiliary display device through the auxiliary display controller.

To accomplish the first object of the present invention, there is also provided a computer having an auxiliary display device including an input device for inputting user's commands, a computer body for performing a predetermined program according to the commands input to the input device, a main display device for displaying signals output from the computer body on a screen, and an auxiliary display device for displaying the signals output from the computer body on a screen together with the main display device, wherein the computer body includes a display controller for controlling the main display device and the auxiliary display device, and after booting when a power supply of the computer body is turned on, the computer body executes a predetermined application program, and displays the execution result thereof on the auxiliary display device through the auxiliary display controller.

Preferably, the display controller includes a graphic controller for receiving data from a bus to process a predetermined function, a main graphic memory for storing the data output from the graphic controller, a first data serializer for receiving data output from the main graphic memory to convert it to a serial bit stream, a first attribute controller for receiving data output from the first data serializer and then converting it to appropriate color data, to output the converted color data to the main display device, an auxiliary graphic memory for storing the data output from the graphic controller, a second data serializer for receiving data output from the auxiliary graphic memory to convert it to a serial bit stream, a second attribute controller for receiving data output from the second data serializer and then converting it to appropriate color data, to output the converted color data to the auxiliary display device, a sequencer for generating clocks in a unit of a pixel or a character and controlling a sequence of all functions of the display controller, to generate read clocks and write clocks of the main graphic memory and the auxiliary graphic memory, a main display controller for generating signals related to timing to control the main display device, and an auxiliary display device for generating signals related to timing to control the auxiliary display device.

Preferably, the auxiliary graphic memory includes first and second auxiliary graphic memories.

Preferably, when a power supply of the computer body is turned on, the computer body performs a predetermined application program, and displays the execution result thereof through the graphic controller of the display controller and the first auxiliary graphic memory.

Preferably, when a predetermined application program is executed, the computer body performs the steps of: a) checking display selection information of the application program or a user, to determine whether the main display device is selected or the auxiliary display device is selected; b) when it is determined that the main display device is selected in the step a), displaying the execution result of the application program on the main display device through the graphic controller and the main graphic memory; c) when it is determined that the auxiliary display device is selected in the step a), enabling the second auxiliary graphic memory through the graphic controller; d) displaying the execution result of the application program on the auxiliary display device through the second auxiliary graphic memory; e) checking whether the application program is terminated, and if not, returning to the step d), and if terminate, performing the next step; and f) when it is determined that the application program is terminated in the step e), controlling the graphic controller to enable the first auxiliary graphic memory.

To accomplish the second object of the present invention, there is provided a display method of the execution result of an application program for a computer having an auxiliary display device including the steps of: a) when an application program is executed, checking display selection information of the application program or a user, to determine whether a main display device is selected or an auxiliary display device is selected; b) when it is determined that the main display device is selected in the step a), displaying the execution result of the application program on the main display device through the main display controller; and c) when it is determined that the auxiliary display device is selected in the step a), displaying the execution result of the application program on the auxiliary display device through the auxiliary display controller.

Also, to accomplish the second object of the present invention, there is provided another display method of the execution result of an application program for a computer having an auxiliary display device including the steps of: a) checking display selection information of said application program or a user, to determine whether said main display device is selected or said auxiliary display device is selected; b) when it is determined that the main display device is selected in the step a), controlling the graphic controller to display the execution result of the application program on the main display device through the main graphic memory; c) when it is determined that the auxiliary display device is selected in the step a), controlling the graphic controller to enable the second auxiliary graphic memory; d) displaying the execution result of the application program on the auxiliary display device through the second auxiliary graphic memory; e) checking whether the application program is terminated, and if not, returning to the step d), and if terminated, performing the next step; and f) when it is determined that the application program is terminated in the step e), controlling the graphic controller to enable the first auxiliary graphic memory.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
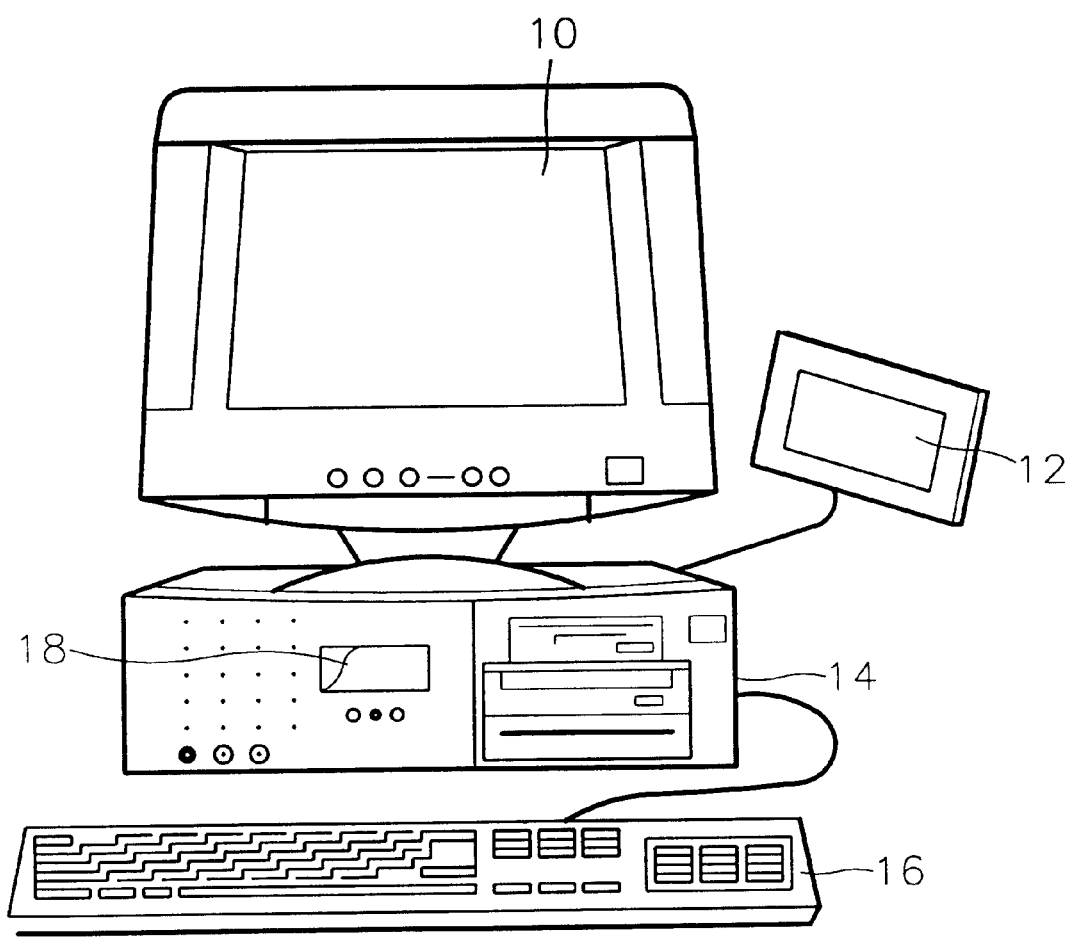
FIG. 1 shows an external appearance of a computer having an auxiliary display device according to the present invention.

Referring to FIG. 1, a computer having an auxiliary display device includes a key board 16 for receiving commands of a user, a computer body 14 having a vacuum fluorescent display (VFD) 18 of a character display device showing a computer state at a front side portion and performing a predetermined program according to the user's commands input to the keyboard 16, a main display device 10 for displaying signals output from the computer body 14 on a screen and an auxiliary display device 12 for displaying the signals output from the computer body 14 on the screen together with the main display device 10.

As shown in FIG. 1, according to the computer having an auxiliary display device of the present invention, by including the auxiliary display device 12 as well as the main display device 10, during a multitasking operation, without dividing the screen of the main display device 10, main application programs may be displayed on the main display device 10, and auxiliary application programs thereof may be displayed on the auxiliary display device 12. Accordingly, the operation may be more effectively performed. The detailed operation and a structure therefor will be described with reference to FIGS. 2 through 8.

Figure 2:
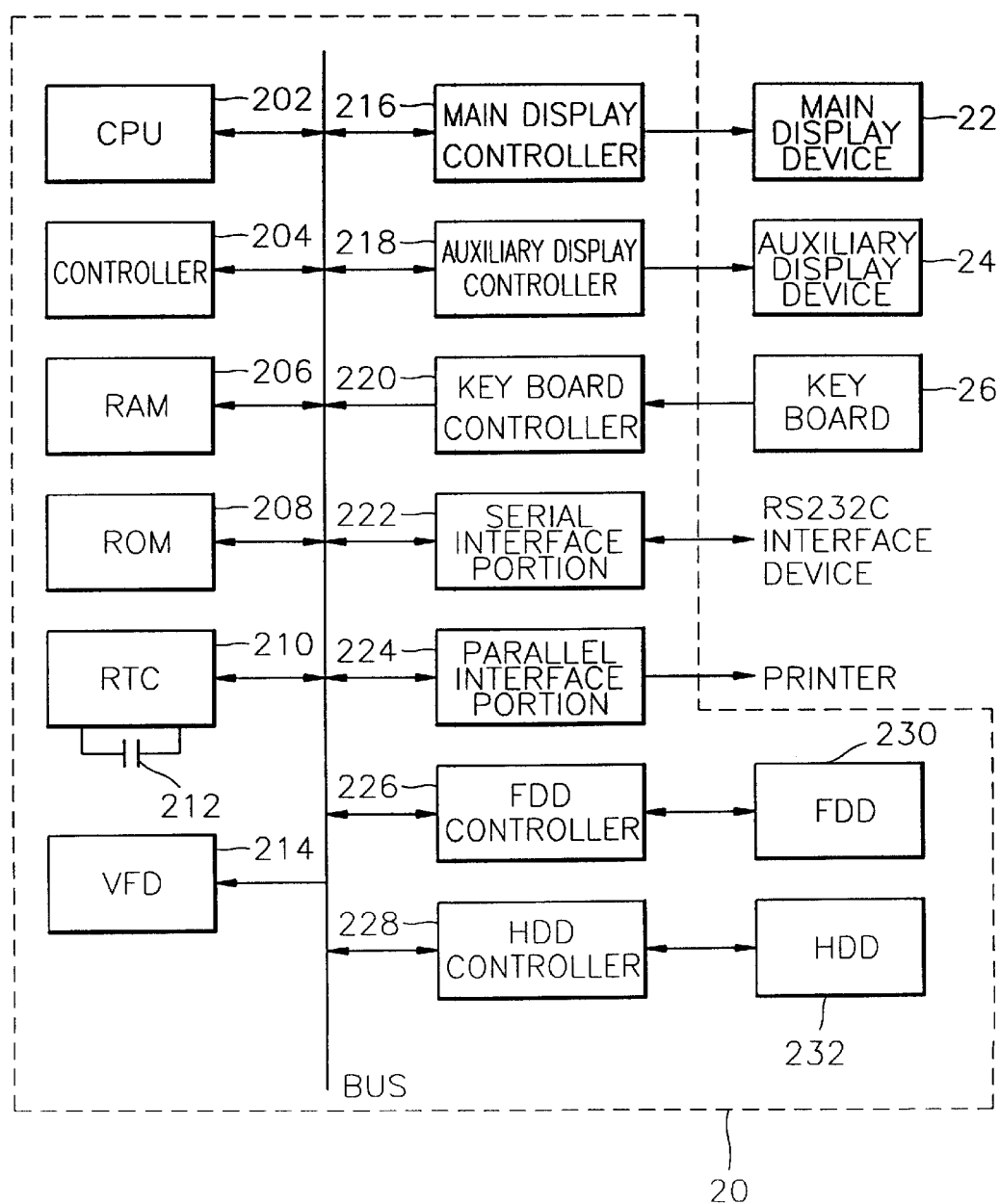
FIG. 2 is a block diagram of a computer having an auxiliary display device according to a first embodiment of the present invention.

Referring to FIG. 2, a computer having an auxiliary display device according to a first embodiment of the present invention includes a key board 26 for receiving user's commands, a computer body 20 for performing predetermined programs according to the user's commands input to the keyboard 26, a main display device 22 for displaying signals output from the computer body 20 on a screen and an auxiliary display device 24 for displaying the signals output from the computer body 20 on a screen together with the main display device 22.

Also, the computer body 20 includes a central processing unit (CPU) 202 for performing, processing, and calculating programs, a main display controller 216 for controlling the main display device 22, an auxiliary display controller 218 for controlling the auxiliary display device 24, a controller 204 having a DMA controller for controlling direct memory access (DMA), a programmable interrupt controller set by programs and a bus controller for controlling a bus, a random access memory (RAM) 206 in which system software and user's software are loaded, a read only memory (ROM) 208 having a program for initializing and self-testing during power-on of the computer and a basic input-output system (BIOS) for interfacing a hardware and a software, a real time clock (RTC) 210 being a timer module having an additional battery 212, a key board controller 220 for controlling the key board 26, a serial interface portion 222 for serially communicating with a RS232C interface device being an external device, a parallel interface portion 224 for parallel communicating with the parallel interface device such as a parallel printer, a floppy disk drive (FDD) 230 for driving a floppy disk, a floppy disk drive controller 226 for controlling the floppy disk drive 230, a hard disk drive (HDD) 232 being a data storage, a hard disk drive controller 228 for controlling the hard disk drive 232 and a vacuum fluorescent display (VFD) 214 being a character output device showing a computer state, which is controlled by a micro-computer receiving the commands of the CPU 202.

A computer having an auxiliary display device shown in FIG. 2 includes the auxiliary display controller 218 for controlling the auxiliary display device 24 of FIG. 2 and the operation thereof will be described with reference to FIGS. 3 and 4.

Figure 3:
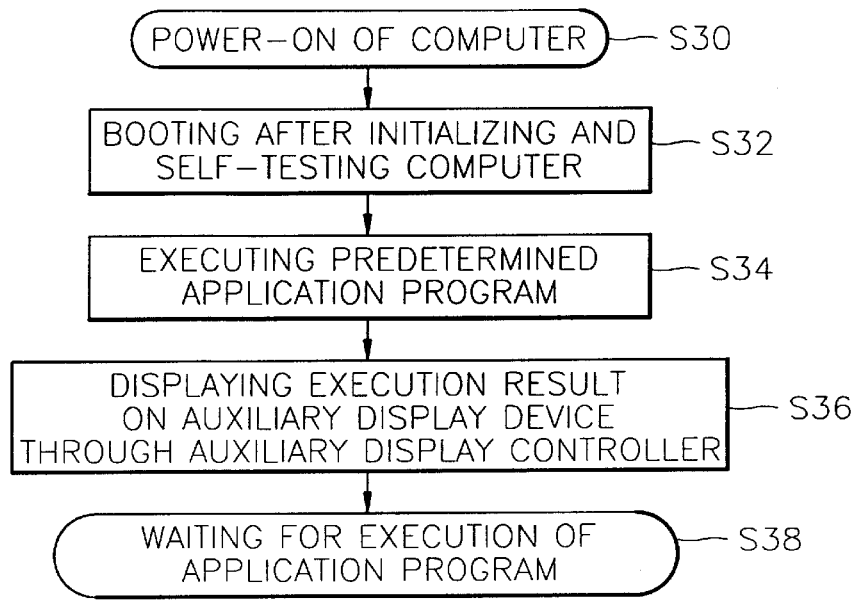
FIG. 3 is a flow chart of an initialization process for the computer having an auxiliary display device of FIG. 2.

Referring to FIG. 3, when a power supply of the computer body 20 is turned on (step 30), programs for initializing and self-testing stored in the ROM 208 are performed to boot the system software (step 32). After booting, predetermined application programs, for example, a clock program is automatically executed (step 34). The result that the program is executed, is displayed on the auxiliary display device 24 by the auxiliary display controller 218 (step 36), and the CPU 202 waits for execution of an application program by a user (step 38).

As described above, during initialization, the predetermined program is additionally displayed on the auxiliary display device 24, so that a user can obtain desired information from the auxiliary display device 24.

Figure 4:
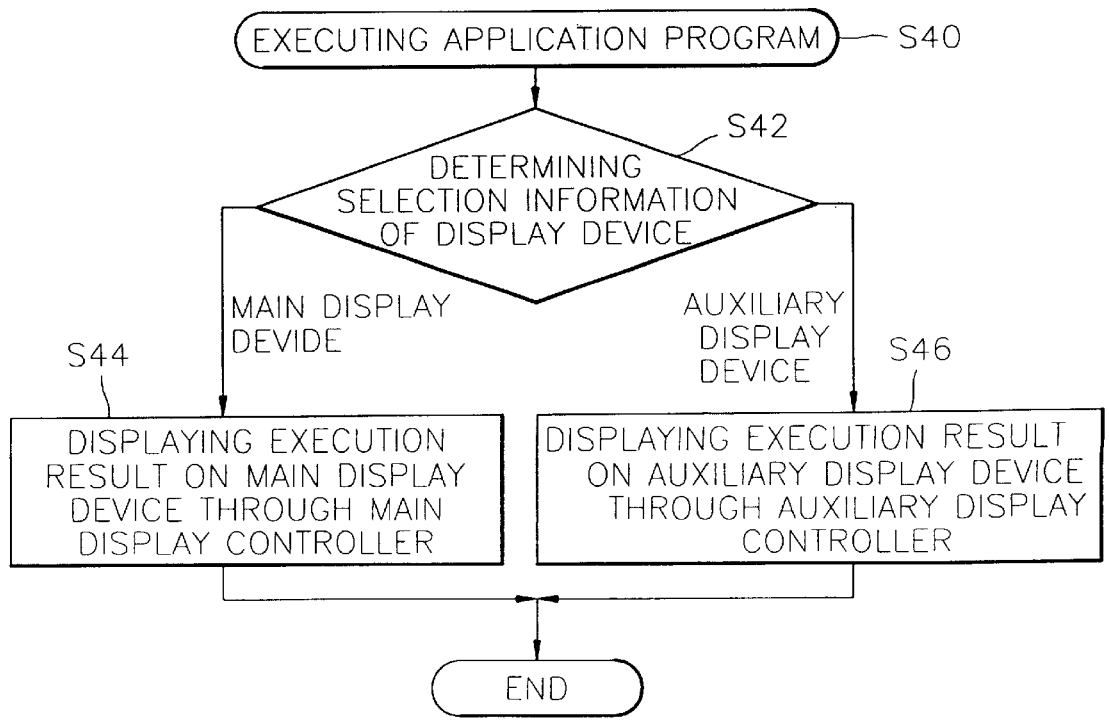
FIG. 4 is a flow chart of a display method of the execution result of an application program for the computer having an auxiliary display device of FIG. 2.

Referring to FIG. 4, when an application program is executed (step 40), it is determined which display device is selected according to the display selection information of the application program or display selection information input by the user (step 42). When it is determined that the main display device 22 is selected in the step 42, the execution result of the application program is displayed on the main display device 22 through the main display controller 216 (step 44). When it is determined that the auxiliary display device 24 is selected in the step 42, the execution result of the application program is displayed on the auxiliary display device 24 through the auxiliary display controller 218 (step 46).

As described above, according to the first embodiment of the present invention, the main display controller 216 and the auxiliary display controller 218 control the main display device 22 and the auxiliary display device 24, respectively.

Figure 5:
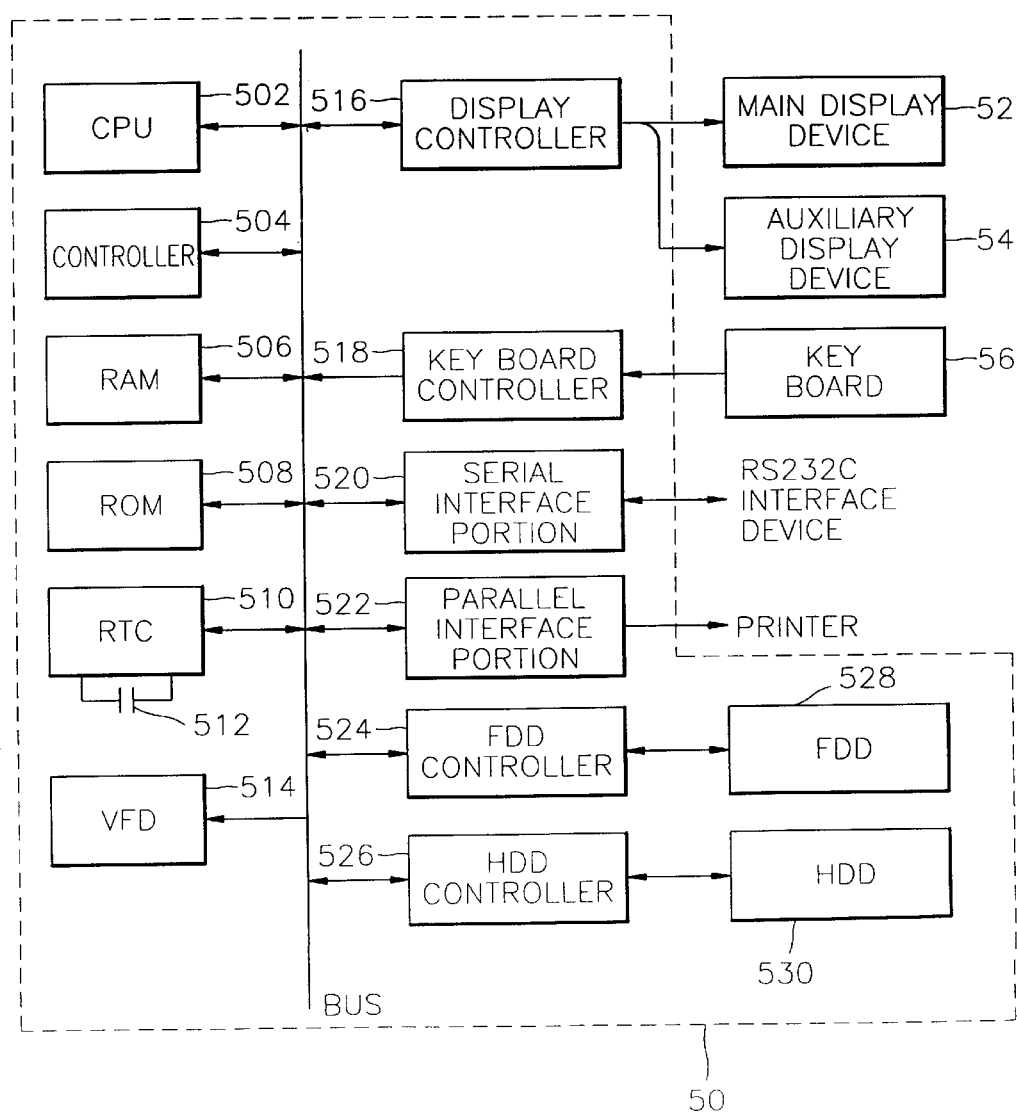
FIG. 5 is a block diagram of a computer having an auxiliary display device according to a second embodiment of the present invention.

According to a second embodiment of the present invention, as shown in FIG. 5, a computer having an auxiliary display device includes a keyboard 56 for receiving user's commands, a computer body 50 for performing predetermined programs according to the commands input to the keyboard 56, a main display device 52 for displaying signals output from the computer body 50 on a screen and an auxiliary display device 54 for displaying the signals output from the computer body 50 on a screen together with the main display device 52.

Additionally, the computer body 50 includes a central processing unit (CPU) 502 for performing, processing, and calculating programs, a main display controller 516 for controlling the main display device 52 and the auxiliary display device 54, a controller 504 having a DMA controller for controlling direct memory access (DMA), a programmable interrupt controller set by programs and a bus controller for controlling a bus, a random access memory (RAM) 506 in which system software and user's software is loaded, a read only memory (ROM) 508 having a program for initializing and self-testing during power-on of the computer and a basic input-output system (BIOS) for interfacing a hardware and a software, a real time clock (RTC) 510 being a timer module having an additional battery 512, a key board controller 518 for controlling the key board 56, a serial interface portion 520 for serially communicating with a RS232C interface device being an external device, a parallel interface portion 522 for parallel communicating with the parallel interface device such as a parallel printer, a floppy disk drive (FDD) 528 for driving a floppy disk, a floppy disk drive controller 524 for controlling the floppy disk drive 528, a hard disk drive (HDD) 530 being a data storage, a hard disk drive controller 526 for controlling the hard disk drive 530 and a vacuum fluorescent display (VFD) 514 being a character output device showing a computer state, which is controlled by a micro-computer receiving the commands of the CPU 502.

According to the computer having an auxiliary display device of FIG. 5, the display controller 516 controls the main display device 52 and the auxiliary display device 54, an operation of which will be described with reference to FIGS. 6, 7 and 8.

Figure 6:
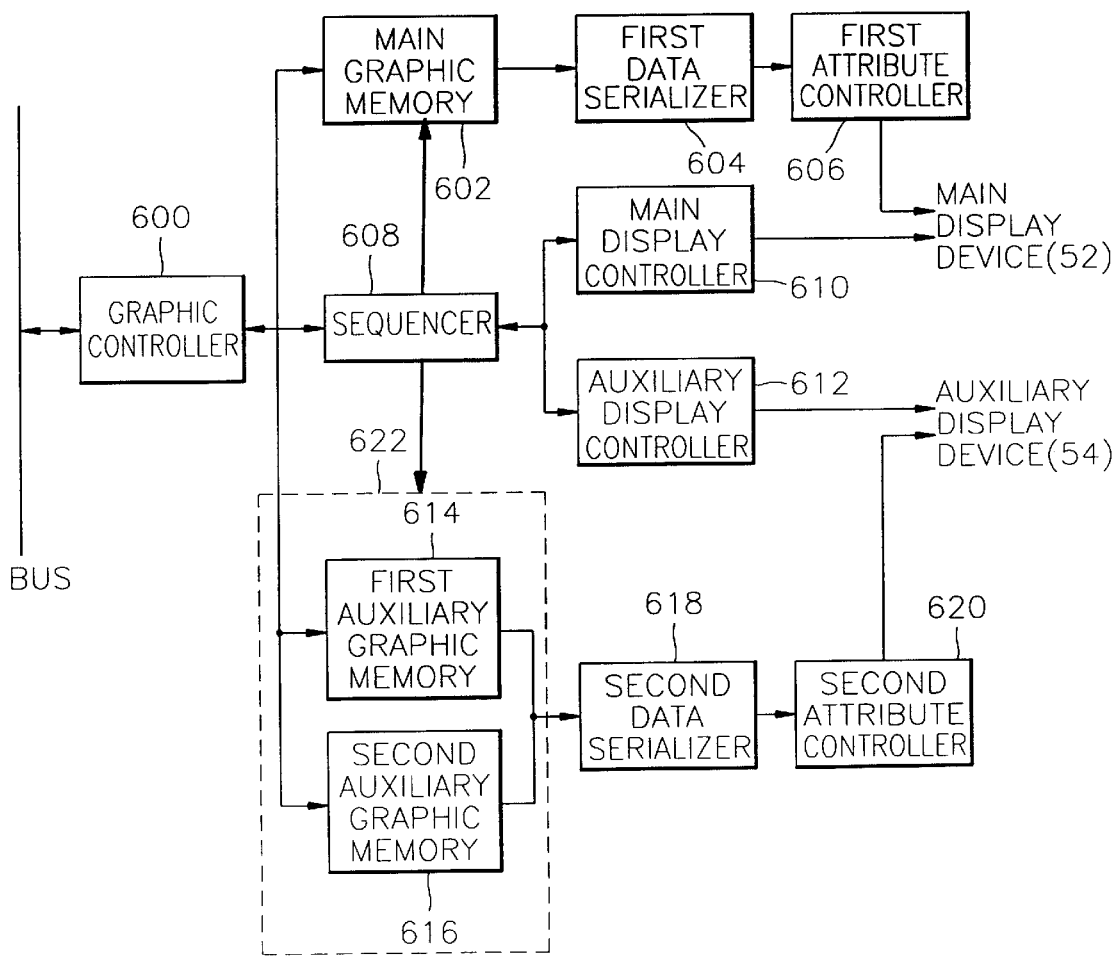
FIG. 6 is a detailed block diagram of a display controller of FIG. 5.

FIG. 6 is a detailed block diagram of the display controller 516 of FIG. 6.

The display controller 516 of FIG. 5 includes a graphic controller 600 for receiving data through a bus to process a predetermined function, a main graphic memory 602 for storing data output from the graphic controller 600, a first data serializer 604 for receiving the data output from the main graphic memory 602 to convert it to a serial beat stream, a first attribute controller 606 for receiving the data output from the first data serializer 604 and converting it to appropriate color data, and then outputting the converted color data to a display device 612, an auxiliary memory 622 including first and second auxiliary graphic memories 614, 616 for storing the data output from the graphic controller 600, a second data serializer 618 for receiving the data output from the auxiliary graphic memory 622 to convert it to a serial beat stream, a second attribute controller 620 for receiving the data output from the second data serializer 618 and converting it to appropriate color data, and then outputting the converted color data to the auxiliary display device 54, a sequencer 608 for generating clocks in a unit of pixels and characters, to control sequence of all functions of the display controller 516 and generate read clocks and write clocks of the main graphic memory 602 and the auxiliary graphic memory 622, a main display controller 610 for generating signals related to timing to control the main display device 52 and an auxiliary display controller 612 for generating signals related to timing to control the auxiliary display device 54.

Figure 7:
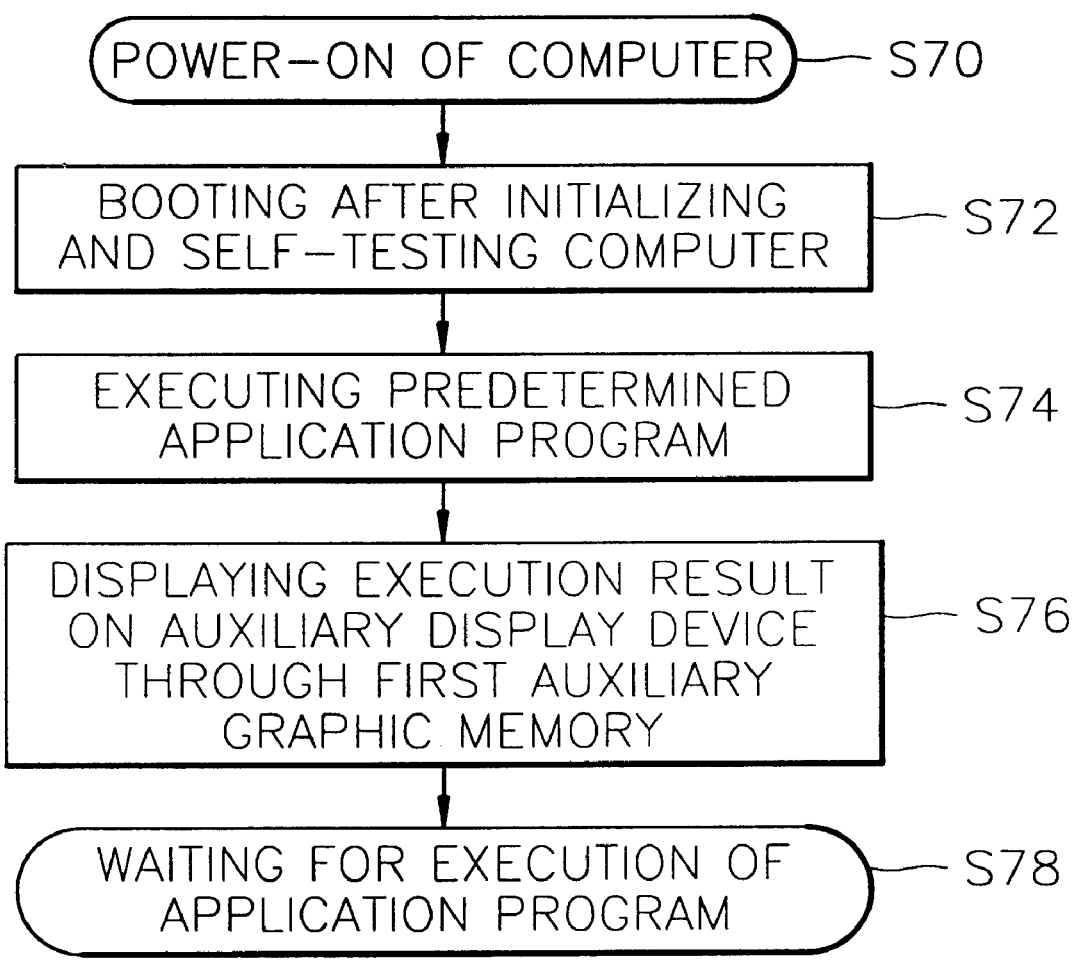
FIG. 7 is a flow chart of an initialization process of the computer having an auxiliary display device of FIG. 5.

Referring to FIG. 7, when a power supply of the computer body 50 is turned on (step 70), programs for initializing and self-testing stored in the ROM 508 are executed to boot the system software (step 72). After booting, a predetermined application program, for example, a clock program is automatically executed (step 74). The graphic controller 600 in the display controller 516 is controlled, and thus the execution result of the program is displayed on the auxiliary display device 54 through the graphic controller 600 of the display controller 516 and the first auxiliary graphic memory 614 (step 76), and the CPU 502 waits for execution of an application program by the user (step 78).

Figure 8:
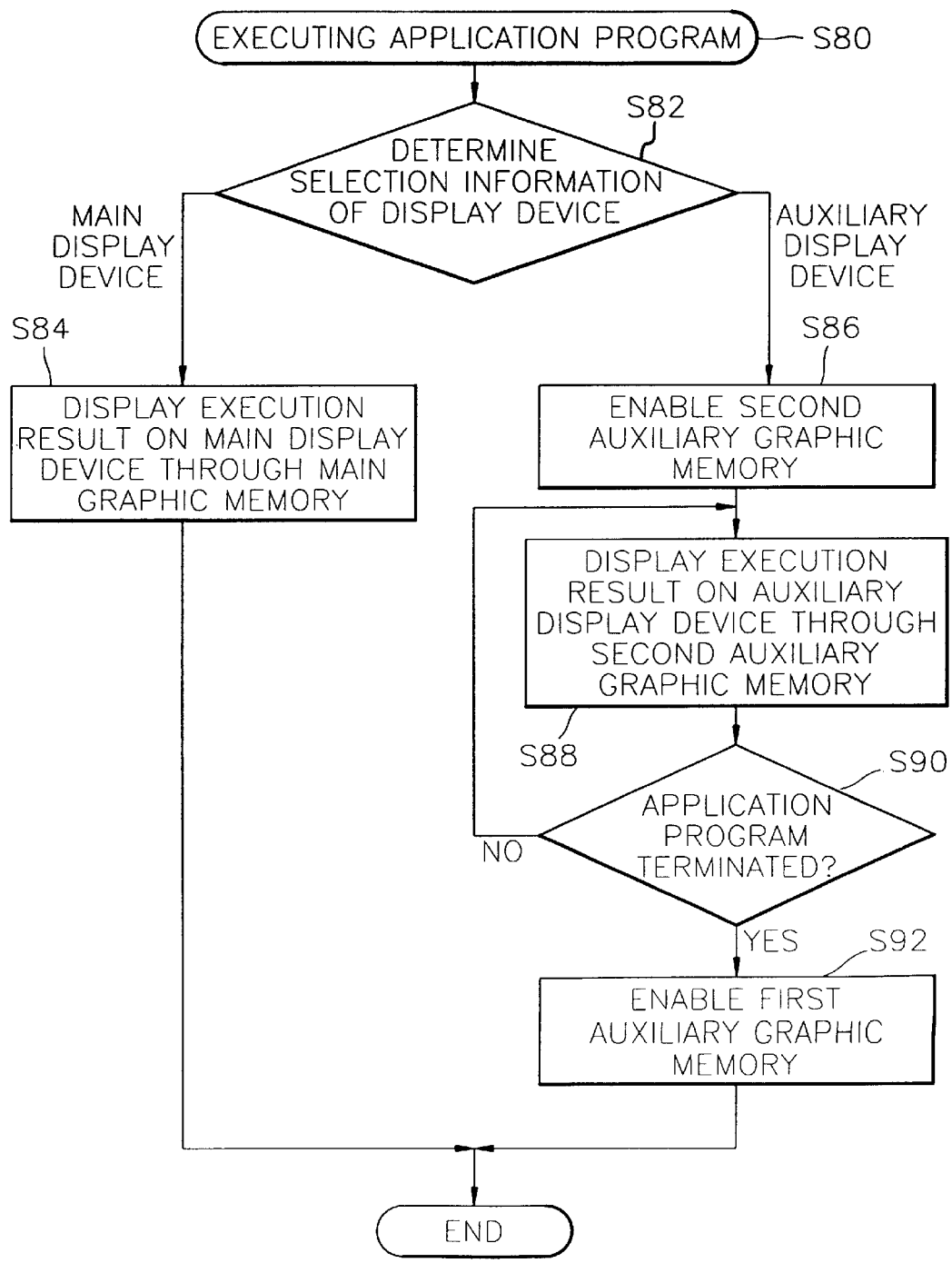
FIG. 8 is a flow chart of a display method of the execution result of an application program for the computer having an auxiliary display device of FIG. 5.

Referring to FIG. 8, when an application program is executed (step 80), it is determined which display device is selected according to the display selection information of the application program or display selection information input by the user (step 82). When it is determined that the main display device 52 is selected in the step 82, the execution result of the application program is displayed on the main display device 52 through the graphic controller 600 of the display controller 516 and the main graphic memory 602 (step 84). When it is determined that the auxiliary display device 54 is selected in the step 82, the graphic controller 600 of the display controller 516 is controlled to enable the second auxiliary graphic memory 616. The graphic controller 600 is controlled, and thus the execution result of the application program is displayed on the auxiliary display device 54 through the second auxiliary graphic memory 616 (step 88). It is checked whether the application program is terminated (step 90), and if not, step 88 continues to be performed. When the application program is terminated, the graphic controller 600 is controlled to enable the first auxiliary graphic memory 614 (step 92).

According to the second embodiment of the present invention, one display controller 516 controls the main display device 52 and the auxiliary display device 54.

As described above, a computer having an auxiliary display device according to the present invention enables a user to work more effectively by including an auxiliary display device as well as a main display device.

What is claimed is:

1. A computer having a main display device and an auxiliary display device comprising:
    an input device for inputting user's commands;
    a keyboard controller responsive to the commands input to said input device;
    a main display controller for controlling said main display device;
    an auxiliary display controller for controlling said auxiliary display device; and
    a central processing unit for controlling said auxiliary display controller to display a program execution result, upon powering up said computer and following a self-test during booting of said computer by executing a predetermined program, and for controlling one of said main display controller and said auxiliary display controller for displaying a result of an application program based upon display information obtained from said input device and said application program.

2. A method of using a computer having a main display device and an auxiliary display device, comprising the steps of:
    performing a power-on-self-test operation upon powering up said computer;
    executing a predetermined program upon completion of said power-on-self-test operation;
    displaying an execution result of said step of executing a predetermined program only on said auxiliary display device;
    executing an application program after displaying said execution result; and
    selecting one of said main display device and said auxiliary display device for displaying an execution result of said step of executing an application program, wherein said step of selecting responds to display selection information within said application program and user activation of a predetermined key of a keyboard connected to said computer, such that said execution result of said predetermined program remains on said auxiliary display device when main display device is selected in said step of selecting.

3. The method as set forth in claim 2, wherein said step of displaying an execution result of said step of executing a predetermined program comprises displaying said execution result of said predetermined program through an auxiliary controller.

4. The method as set forth in claim 2, wherein said step of displaying an execution result of said step of executing a predetermined program comprises displaying said execution result of said predetermined program through a first auxiliary graphic memory of a display controller for controlling both said main display device and said auxiliary display device.

5. The method as set forth in claim 2, wherein said step of displaying an execution result of said step of executing an application program comprises displaying the execution result of said application program on said main display device through a main display controller, when said main display device is selected.

6. The method as set forth in claim 2, wherein said step of displaying an execution result of said step of executing a n application program comprises displaying the execution result of said application program on said auxiliary display device through an auxiliary display controller, when said auxiliary display device is selected.

7. The method as set forth in claim 2, wherein said step of displaying an execution result of said step of executing an application program comprises the steps of:
    displaying the execution result of said application program on said main display device through a main display controller, when said main display device is selected; and
    displaying the execution result of said application program on said auxiliary display device through an auxiliary display controller, when said auxiliary display device is selected.

8. The method as set forth in claim 4, wherein said step of displaying an execution result of said step of executing an application program comprises displaying the execution result of said application program on said main display device through a main graphic memory, when said main display device is selected.

9. The method as set forth in claim 4, wherein said step of displaying an execution result of said step of executing an application program comprises displaying the execution result of said application program on said auxiliary display device through a second a uxiliary graphic memory, when said auxiliary display device is selected.

10. The method as set forth in claim 4, wherein said step of displaying an execution result of said step of executing an application program comprises the steps of:
    displaying the execution result of said application program on said main display device through a main graphic memory, when said main display device is selected; and
    displaying the execution result of said application program on said auxiliary display device through an auxiliary graphic memory, when said auxiliary display device is selected.

11. The method as set forth in claim 10, wherein said step of displaying said execution result of said application program on said auxiliary display device comprises the steps of:

enabling said second auxiliary graphic memory;

displaying said execution result of said application program on said auxiliary display device;

determining whether said application program has terminated; and enabling said first auxiliary graphic memory when it is determined that said application program has terminated.

12. A computer having a main display device and an auxiliary display device comprising:

an input device for inputting user's commands;

a computer body for performing a predetermined program according to the commands input to said input device;

a display controller for selectively controlling said main display device and said auxiliary display device, said main display device displaying signals output from said computer body on a screen when selected by said display controller, and said auxiliary display device displaying signals output from said computer body on a screen when selected by said display controller;

said display controller immediately controlling only said auxiliary display device to display a program execution result of a predetermined program following a self-test during booting of said computer, wherein the result of said predetermined program continues to be displayed on said auxiliary display device when said display controller selects said main display device to display a result of an application program; and said display controller controlling said auxiliary display device to display a result of said application program instead of the result of said predetermined program when said display controller selects said auxiliary display device instead of said main display device, and controlling said auxiliary display device to display said result of said predetermined program upon termination of said application program.

13. The computer having a main display device and an auxiliary display device according to claim 12, said display controller comprising:

a graphic controller for receiving data from a bus to process a predetermined function;

a main graphic memory for storing said data output from said graphic controller;

a first data serializer for receiving data output from main graphic memory to convert said data to a serial bit stream of data;

a first attribute controller for receiving said serial bit stream of data output from said first data serializer and then converting said serial bit stream of data to appropriate color data, to output the color data to said main display device;

an auxiliary graphic memory for storing said data output from said graphic controller;

a second data serializer for receiving data output from said auxiliary graphic memory to convert said to a serial bit stream;

a second attribute controller for receiving said serial bit stream output from said second data serializer and then converting said serial bit stream to appropriate color data, to output the color data to said auxiliary display device;

a sequencer for generating clocks in a unit of a pixel or a character and controlling a sequence of all functions of said display controller, to generate read clocks and write clocks of said main graphic memory and said auxiliary graphic memory;

a main display controller responsive to an output of said sequencer for generating signals related to timing to control said main display device; and an auxiliary display controller responsive to an output of said sequencer for generating signals related to timing to control said auxiliary display device.

14. The computer having a main display device and an auxiliary display device according to claim 13, wherein said auxiliary graphic memory comprises first and second auxiliary graphic memories.

15. The computer having a main display device and an auxiliary display device according to claim 14, wherein said execution result of said predetermined program is displayed on said auxiliary display device through said first auxiliary graphic memory.

16. The computer having a main display device and an auxiliary display device according to claim 14, wherein said first auxiliary graphic memory is enabled to output data for display on said auxiliary display device upon power up of said computer, said main graphic memory is enabled to output data for display on said main display device according to a selection control signal output from said sequencer during execution of said application program, and said second auxiliary graphic memory is enable to output data for display on said auxiliary display device according to another selection control signal output from said sequencer during execution of said application program.

* * * * *